United States Patent
Mayer Pujadas et al.

(10) Patent No.: US 11,128,037 B2
(45) Date of Patent: Sep. 21, 2021

(54) RADOME FOR VEHICLES

(71) Applicant: Zanini Auto Grup, S.A., Parets del Vallès (ES)

(72) Inventors: Augusto Mayer Pujadas, Parets del Vallès (ES); Jerson Jair Peralta, Parets del Vallès (ES); Josep Maria Armengol Rocaspana, Parets del Vallès (ES)

(73) Assignee: Zanini Auto Grup, S.A., Parets del Vallès (ES)

( * ) Notice: Subject to any disclaimer, the term of this patent is extended or adjusted under 35 U.S.C. 154(b) by 0 days.

(21) Appl. No.: 16/027,402

(22) Filed: Jul. 5, 2018

(65) Prior Publication Data

US 2019/0013576 A1   Jan. 10, 2019

(30) Foreign Application Priority Data

Jul. 5, 2017   (EP) ..................................... 17382436

(51) Int. Cl.
*H01Q 1/42*   (2006.01)
*H01Q 1/32*   (2006.01)
*G02B 1/11*   (2015.01)

(52) U.S. Cl.
CPC ................. *H01Q 1/42* (2013.01); *G02B 1/11* (2013.01); *H01Q 1/3233* (2013.01); *H01Q 1/422* (2013.01)

(58) Field of Classification Search
CPC ........ H01Q 1/42; H01Q 1/3233; H01Q 1/422; G02B 1/11; B29K 2027/12
See application file for complete search history.

(56) References Cited

U.S. PATENT DOCUMENTS

| | | | | |
|---|---|---|---|---|
| 2010/0272932 A1* | 10/2010 | Izumo | ..................... | C23C 28/00 428/34.1 |
| 2012/0119961 A1* | 5/2012 | Mayer Pujadas | .... | H01Q 1/3283 343/713 |
| 2013/0330525 A1* | 12/2013 | Yoshinaga | .............. | B32B 15/08 428/201 |
| 2014/0004334 A1* | 1/2014 | Kalyankar | ............... | C09D 5/14 428/312.6 |
| 2016/0130176 A1* | 5/2016 | Cho | ...................... | H01Q 1/3233 428/216 |
| 2017/0168137 A1* | 6/2017 | Cho | ....................... | G01S 13/931 |
| 2017/0307790 A1* | 10/2017 | Bellman | ................ | C09D 5/006 |

FOREIGN PATENT DOCUMENTS

EP   2383364   11/2011
EP   3181719   6/2017

OTHER PUBLICATIONS

European Search Report dated Dec. 20, 2017 from the European Patent Office Re. Application No. EP 17382436. (3 Pages).

\* cited by examiner

*Primary Examiner* — Dameon E Levi
*Assistant Examiner* — David E Lotter

(57) ABSTRACT

A radome (10) for vehicles defining a proximal side and a distal side, comprising a base layer (1) formed of a radio transmissive resin, the base layer (1) defining a proximal face and a distal face; a decoration layer (2) applied to the proximal face of the base layer (1), the decoration layer (2) comprising a metalloid or a metalloid alloy; characterized in that the radome (10) also comprises an anti-reflective coating (4) placed proximal with respect to the decoration layer (2).

The anti-reflection layer will eliminate the high reflecting disturbances introduced by the top coat, which will significantly improve radome aesthetics.

8 Claims, 4 Drawing Sheets

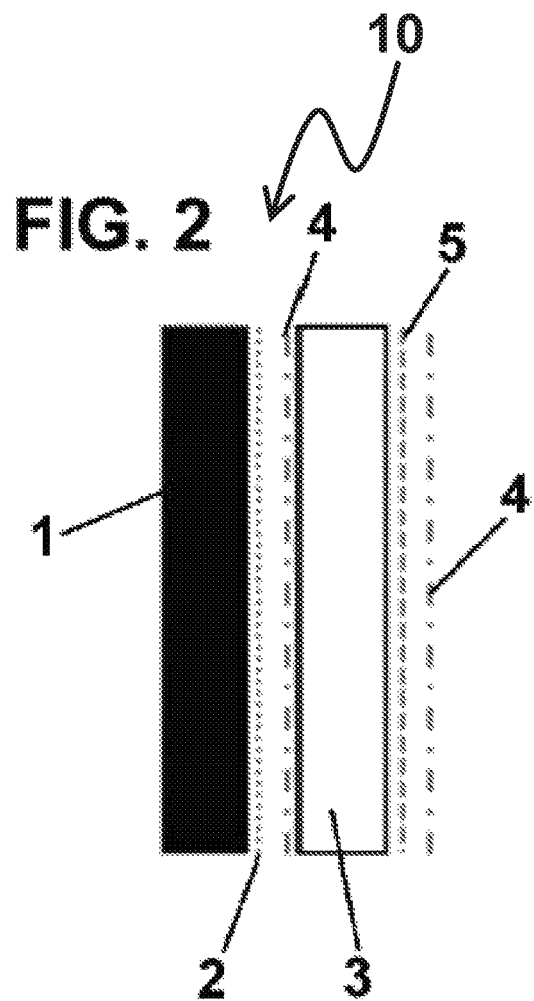

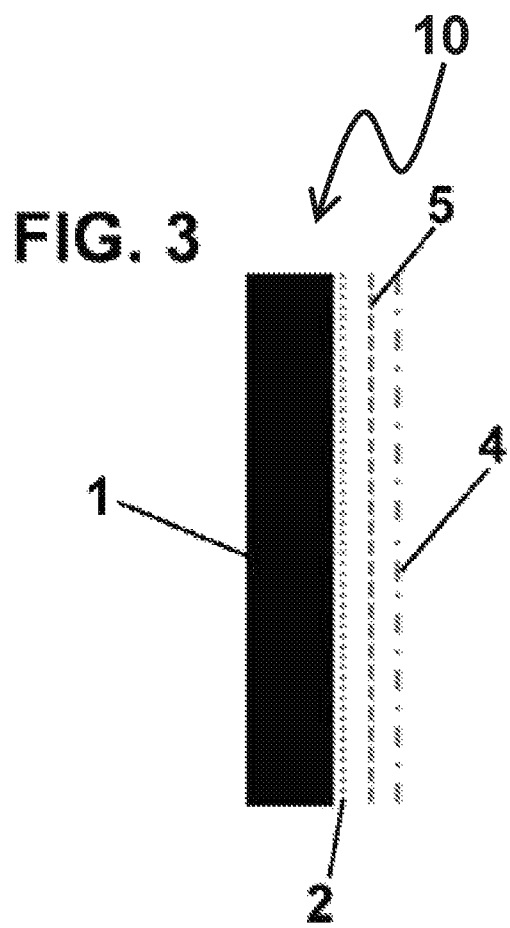

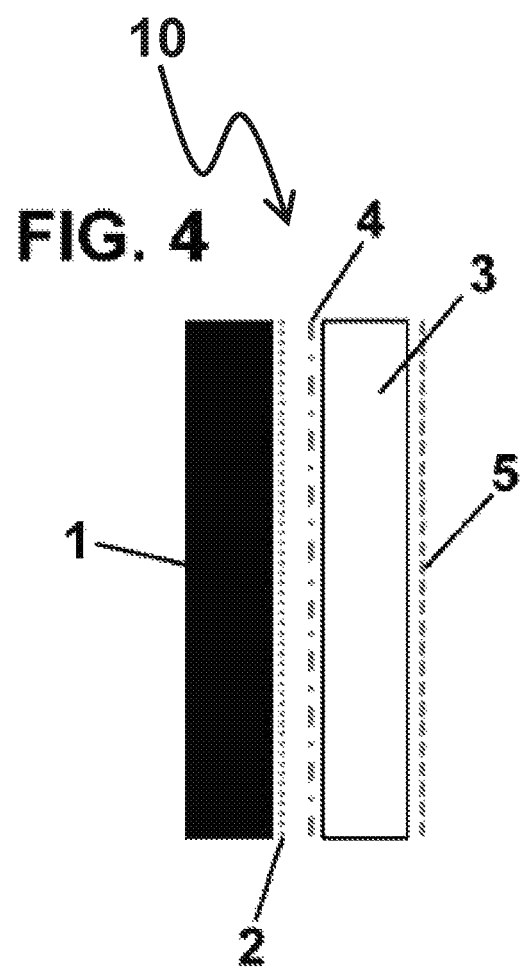

RADOME FOR VEHICLES

RELATED APPLICATION

This application claims the benefit of priority of European Patent Application No. 17382436.8 filed Jul. 5, 2017, the contents of which are incorporated herein by reference in their entirety.

FIELD AND BACKGROUND OF THE INVENTION

The present invention refers to a radome for protecting a radar device while presenting an outstanding aesthetical appearance, especially for radar devices disposed behind the front grill of an automobile.

In general, radio transmitter-receiver devices, such as a millimeter-wave radar, have been employed as sensors for vehicular collision avoidance and adaptive cruise control systems.

In a radar system or the like that measures obstacles in front of an automobile and the distance between automobiles, the antenna was preferably positioned in the center at the front of the vehicle to obtain maximum performance. Although the radar antenna could be installed near the front grill of automobile, it was preferable to conceal the antenna from view due to its non-aesthetic appearance and to shield the antenna from external environmental factors such as weather and airborne contaminants.

To protect the antenna and avoid radio interference and signal losses of the radar device, it has been proposed to provide a radar window capable of transmitting radio waves in the front grill corresponding where the radar antenna was located. This allowed radio waves to pass in and out through the window. However, the radar window diminished the appearance of the front grill due to the interruption of the pattern of the grill structural elements. Further, unsightly internal portions of the vehicle, like the radar transmitter-receiver, could be seen through the radar window.

In U.S. Pat. No. 6,328,358 unity between the radar window and the front grill body was provided. The radar window as disclosed in U.S. Pat. No. 6,328,358 was formed by laminating a plurality of resin layers formed with concavity and convexity. This component provided an impression by a metal layer deposited with concavity and convexity between the resin layers such that the fin member of the front grill appeared to extend across the radar window without interruption.

WO2012066417A1, in the name of the same applicant than the present application, discloses a decorative radome comprising a substrate made of a radio transmissive resin, a decoration layer comprising a plurality of metalloid or metalloid alloy (Si, Ge) layers applied to the substrate proximal face, a radio transmissive resin overlying the decoration layer, the resin overlying the decoration layer including a decoration ink overlay and, last but not least, a protective hard coat on top of the overlying radio transmissive resin.

A limitation takes place regarding high gloss reflectivity of the protection hard coat applied on top of the overlying radio transmissive resin. Reflections at optical frequencies occur at the interfaces of the overlying radio transmissive resin, mostly at its interfaces with air. This impedes to clearly distinguish any pattern drawings, logos or any other image design contained on the substrate described in WO2012066417A1.

Anti-reflection coatings have been known for a long time. The simplest anti-reflection coating applies a quarter-wavelength thick layer of a material having a refractive index equal to the root-square refractive index of the material layer over which the anti-reflection coating is going to be deposited. This method is limited performance-wise, and so the successive deposition of several layers is preferred as anti-reflection coating. Each layer has its own refractive index and thickness, and to define them, the principle described above holds. This way, the bandwidth and the decrease of the reflection level can be improved.

In U.S. Pat. No. 3,185,020, a three-layer anti-reflection coating is described. A four-layer anti-reflection coating is described in U.S. Pat. No. 3,781,090. Both previous patents use evaporation methods for the anti-reflection layer deposition. In U.S. Pat. No. 4,929,278, a different deposition method, based on sol-gel, is employed to improve the efficiency of solar cells. However, the method in U.S. Pat. No. 4,929,278 leads to unacceptable curing times if an industrialized in-line production is required, because the time in stock of the samples would lead to a large product cost increase. In U.S. Pat. No. 5,476,717, an anti-reflection, hydrophobic and abrasion resisting coating is described. To achieve these properties, successive depositions take place, and the process becomes complex and costly.

Therefore, the object of the present invention is to overcome these limitations, providing other advantages that will be disclosed hereinafter.

SUMMARY OF THE INVENTION

The radome for vehicles according to the present invention comprises the features according to claim 1. Additional optional features are disclosed in the dependent claims.

The radome for vehicles defines a proximal side and a distal side, and comprises:
- a base layer formed of a radio transmissive resin, the base layer defining a proximal face and a distal face;
- a decoration layer applied to the proximal face of the base layer, the decoration layer comprising a metalloid or a metalloid alloy; and
- an anti-reflective coating placed proximal with respect to the decoration layer.

The radome can also comprise a transparent resin layer placed proximal with respect to the decoration layer, and a coat layer placed proximal with respect to the decoration layer.

The anti-reflective coating comprises preferably a plurality of layers of a dioxide of titanium or germanium, and the decoration layer can also comprise one or more oxides.

It must be pointed out that the decoration layer can be formed only from, or consist of, a metalloid or a metalloid alloy, which can include one or more oxides.

Preferably, said oxide(s) is(are) selected from Titanium (Ti), Vanadium (V), Chromium (Cr), Manganese (Mn), Zirconium (Zr), Niobium (Nb), Molybdenum (Mo), Hafnium (Hf), Tantalum (Ta), Tungsten (W), Iridium (Ir), Nickel (Ni), Platinum (Pt), Silver (Ag), Indium (In), Thallium (Tl), Silicon (Si), Germanium (Ge), Gallium (Ga) or Aluminium (Al), and said metalloid or the metalloids of the alloy are selected from Silicon, Boron, Germanium, Arsenic, Antimony and/or Tellurium.

Advantageously, the metalloid or metalloid alloy combined with said oxide(s) is deposited on the surface of the proximal face by means of any suited Physical Vapor Deposition (PVD) or Chemical Vapor Deposition (CVD) processes.

Furthermore, the radome for vehicles according to the invention further includes preferably an optically transparent, radio transmissive resin layer overlying the decoration layer, and the resin layer can include a decoration ink overlay or, in geometries where ink overlay technique is not suited, overmolding of another optically non-transparent, radio transmissive resin.

A liquid hard coat layer is applied on top of the overlying radio transmissive resin to protect the substrate material from mechanical, chemical or radiation stresses. This varnish gives a very glossy shade on the surface pointing outwards from the vehicle, which causes some optical disturbances and does not permit clear observation of the metallic decoration behind.

To diminish the disturbances introduced by the hard coat layer, an anti-reflecting layer will be added on top of the hard coat layer to decrease the optical reflections at the air interface and improve the visual perception of all decorative details contained below, no matter which ambient conditions the object is in. This layer will be chosen to have excellent adhesion properties with the hard coat, otherwise the durability of the visual improvement could be severely constrained. Thus, depending on the resin material selected to cover the radome substrate and its decoration layer, the hard coat will be selected afterwards, and the same will be done finally with the anti-reflection layer.

The anti-reflection layer will be applied by means of PVD Electron Beam or Magnetron Sputtering on top of the hard coat, and will be formed by a plurality of layers to diminish the reflectance and increase the bandwidth in the optical regime. The number of layers will be comprised between 3 and 7. Each layer thickness will be selected to optimize the minimize the optical reflectivity as described above. The materials chosen to implement the anti-reflection layers will be a combination of Al2O3, GeO2, SiO2 and TiO2.

With the radome according to the present invention, the anti-reflection layer will eliminate the high reflecting disturbances introduced by the top coat, which will significantly improve radome aesthetics.

BRIEF DESCRIPTION OF THE SEVERAL VIEWS OF THE DRAWINGS

FIG. 2 is a view in cross-section of a second embodiment of the radome according to the present invention;

FIG. 3 is a view in cross-section of a third embodiment of the radome according to the present invention; and FIG. 4 is a view in cross-section of a fourth embodiment of the radome according to the present invention.

DESCRIPTION OF A SPECIFIC EMBODIMENTS OF THE INVENTION

Figure 1:
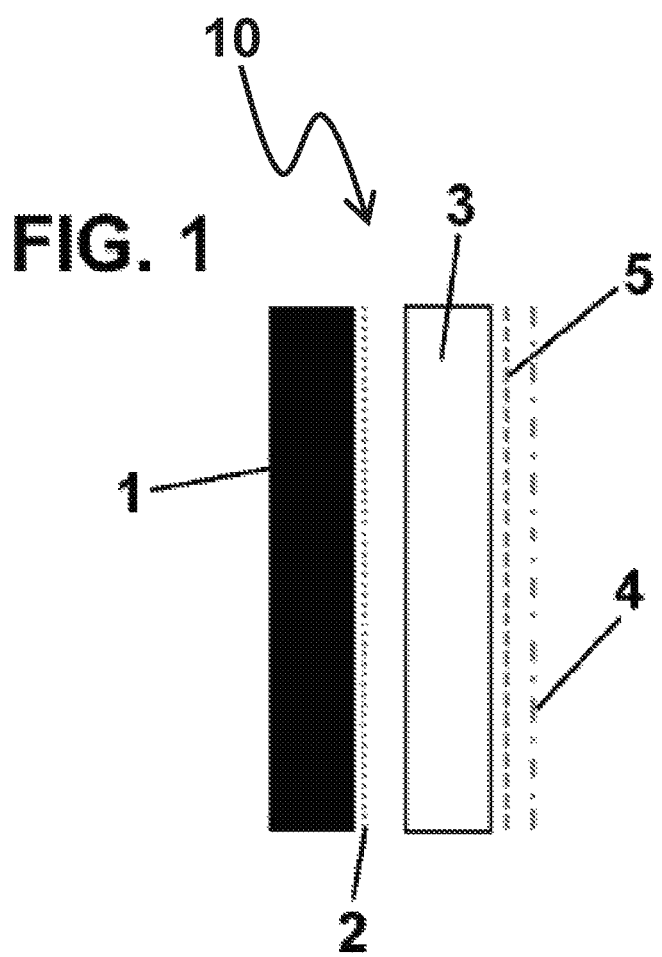
FIG. 1 is a view in cross-section of a first embodiment of the radome according to the present invention.

First of all, in the present specification and in the attached claims by the term "metalloid" is meant any of the following compounds: Silicon, Boron, Germanium, Arsenic, Antimony and/or Tellurium.

Furthermore, in the present specification and in the attached claims by the term "oxide" is meant any of the following oxides: $Ti_xO_y$, $V_xO_y$, $Cr_xO_y$, $Mn_xO_y$, $Zr_xO_y$, $Nb_xO_y$, $Mo_xO_y$, $Hf_xO_y$, $Ta_xO_y$, $W_xO_y$, $Ir_xO_y$, $Ni_xO_y$, $Pt_xO_y$, $Ag_xO_y$, $In_xO_y$, $Tl_xO_y$, $Si_xO_y$, $Ge_xO_y$, $Ga_xO_y$ or $Al_xO_y$, i.e. oxides comprising Titanium (Ti), Vanadium (V), Chromium (Cr), Manganese (Mn), Zirconium (Zr), Niobium (Nb), Molybdenum (Mo), Hafnium (Hf), Tantalum (Ta), Tungsten (W), Iridium (Ir), Nickel (Ni), Platinum (Pt), Silver (Ag), Indium (In), Thallium (Tl), Silicon (Si), Germanium (Ge), Gallium (Ga) or Aluminium (Al).

Radomes cover microwave antennas to protect the antennas from rain, ice, wind and other environmental conditions and are also provided to conceal the antennas form view. A principal requirement is that the radome be transparent to radar or radio waves or provide but minimal signal attenuation and/or distortion.

The radome according to the present invention comprises, as a radome decoration layer, germanium or silicon combined with an oxide, of high electrical resistivity.

Due to the high melting point of germanium 938.25° C. (or silicon 1414° C.) and its boiling point 2833° C. (3265° C. for silicon), this element cannot be deposited using thermal evaporation methods like the ones applied in the case of indium. Nevertheless, this constitutes an advantage.

Into the present invention, Physical Vapor Deposition (PVD) or Chemical Vapor Deposition (CVD) are the possible methods employed for the deposition of metalloid and oxide layers over a substrate comprising a base layer on the proximal face. Due to the deposition process of these techniques, uniformity of the decoration layer can be guaranteed.

The decorative radome 10 for automotive vehicular applications of the present invention comprises a molded radome having a base layer 1 composed of a resin and a bright decoration layer 2 on the surface of the base layer 1, the bright decoration layer 2 being composed of a metalloid, such as, germanium boron, silicon, arsenic, antimony or tellurium and/or a metalloid alloy, which can be combined with one or more oxides.

If using the layer of metalloid and/or metalloid alloy, and oxide, radio transmittance can be improved by several orders of magnitude as compared with an indium layer or other metals such as, tin, as proposed in EP 1560288 A2.

The high electrical conductivity of metals like indium or tin, combined with the variability of thickness of the deposition methods typically used, required each radar window to be tested for radar beam transmissivity during the final stage of production. This increased dramatically the manufacturing cost of the radome.

The lower conductivity of a metalloid combined with oxide layer of the present invention, allows to avoid the requirement for testing of each radome.

Due to the fact of using a combined metalloid plus oxide layer, it is not necessary to create areas where no metallic decoration is applied, since such a layer performs like a dielectric with respect to radar waves. This reduces process complexity in the manufacturing of the radome of the present invention, as compared with the method exemplified in patent JP 2003-252137A.

Further, the decoration layer may comprise alternating strata of one metalloid and/or metalloid alloy and at least one oxide and strata of another metalloid.

The radome 10 according to the present invention can also comprise the following elements, that will be disclosed in the following examples:

A transparent resin layer 3;

An anti-reflective coating 4 made from a plurality layers of titanium dioxide and/or germanium oxide; and A hard coat layer 5.

Thus, it will be seen that there is provided a decorative radome for automotive applications which achieves the various aspects, features and considerations of the present invention and which is well suited to meet the conditions of practical usage.

EXAMPLES

In the first example shown in FIG. 1, the radome 10 according to the present invention comprises, shown in order from the distal to the proximal side of the radome:

1—base layer made from a radio transmissive resin, base layer;

2—bright decoration layer comprising one or more metalloids, or one or more metalloids and one or more oxides on the proximal face;

3—transparent resin layer made from a radio transmissive layer abutting the decoration layer;

5—hard coat on proximal face;

4' anti-reflective coating comprising successive layers of titanium dioxide and germanium dioxide on proximal face.

In the second example shown in FIG. 2, the radome 10 according to the present invention comprises, shown in order from the distal to the proximal side of the radome:

1—base layer made from radio transmissive resin;

2—bright decoration layer comprising one or more metalloids, or one or more metalloids and one or more oxides on proximal face;

3—transparent resin layer made from a radio transmissive layer abutting decoration layer;

5—hard coat on proximal face;

4—anti-reflective coating comprising successive layers of titanium dioxide and germanium dioxide on proximal and distal faces.

In the third example shown in FIG. 3, the radome 10 according to the present invention comprises, shown in order from the distal to the proximal side of the radome:

1—base layer made from a radio transmissive resin, base layer;

2—bright decoration layer comprising one or more metalloids, or one or more metalloids and one or more oxides on the proximal face;

5—hard coat on proximal face;

4—anti-reflective coating comprising successive layers of titanium dioxide and germanium dioxide on proximal face.

In the fourth example shown in FIG. 4, the radome 10 according to the present invention comprises, shown in order from the distal to the proximal side of the radome:

1' base layer made from radio transmissive resin;

2—bright decoration layer comprising one or more metalloids, or one or more metalloids and one or more oxides on proximal face;

3—transparent resin layer made from a radio transmissive layer abutting decoration layer;

5—hard coat on proximal face;

4—anti-reflective coating comprising successive layers of titanium dioxide and germanium dioxide on distal face.

Since various possible embodiments might be made of the present invention and since various changes might be made in the exemplary embodiment shown herein without departing from the spirit of the invention, is to be understood that all matter herein described or shown in the accompanying drawings is to be interpreted as illustrative and not in a limiting sense.

What is claimed is:

1. A radome for vehicles defining a proximal side and a distal side, comprising: a base layer formed of a radio transmissive resin, the base layer defining a proximal face and a distal face; a decoration layer applied to the proximal face of the base layer, the decoration layer comprising a metalloid or a metalloid alloy; an anti-reflective coating placed proximal with respect to the decoration layer; wherein all layers composing said radome are structured on a side of said proximal face of said base layer and said distal face of said base layer is exposed; wherein the radome also comprises a transparent resin layer placed proximal with respect to the decoration layer; wherein the radome comprises an additional anti-reflective coating at the distal side of the transparent resin layer.

2. A radome for vehicles according to claim 1, wherein the radome also comprises a coat layer placed proximal with respect to the decoration layer.

3. A radome for vehicles according to claim 1, wherein the anti-reflective coating is placed on the proximal side of the radome.

4. A radome for vehicles according to claim 1, wherein a coat layer is placed on the proximal side of the transparent resin layer.

5. A radome for vehicles according to claim 1, wherein the anti-reflective coating is placed on the proximal side of the decoration layer.

6. A radome for vehicles according to claim 1, wherein the anti-reflective coating comprises a plurality of layers of a dioxide of titanium or germanium.

7. A radome for vehicles according to claim 1, wherein the decoration layer also comprises one or more oxides.

8. A radome for vehicles according to claim 2, wherein the coat layer is placed on the proximal side of a transparent resin layer.

* * * * *